(12) United States Patent
Herzenjak

(10) Patent No.: US 10,465,630 B2
(45) Date of Patent: Nov. 5, 2019

(54) VEHICLE HAVING AN INTERNAL COMBUSTION ENGINE OPERATED BY MEANS OF A GAS

(71) Applicant: Robert Bosch GmbH, Stuttgart (DE)

(72) Inventor: Florian Herzenjak, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 15/743,030

(22) PCT Filed: May 10, 2016

(86) PCT No.: PCT/EP2016/060473
§ 371 (c)(1),
(2) Date: Jan. 9, 2018

(87) PCT Pub. No.: WO2017/008935
PCT Pub. Date: Jan. 19, 2017

(65) Prior Publication Data
US 2019/0072055 A1    Mar. 7, 2019

(30) Foreign Application Priority Data

Jul. 10, 2015    (DE) .......................... 10 2015 212 988

(51) Int. Cl.
*F02M 21/02*    (2006.01)
*B60K 15/03*    (2006.01)
*F02B 43/12*    (2006.01)

(52) U.S. Cl.
CPC ... *F02M 21/0293* (2013.01); *B60K 15/03006* (2013.01); *F02B 43/12* (2013.01);
(Continued)

(58) Field of Classification Search
CPC ........... F02M 21/0293; F02M 21/0242; F02M 21/0221; F02B 43/12; B60K 15/03006; B60K 2015/03026
See application file for complete search history.

(56) References Cited

U.S. PATENT DOCUMENTS 5,473,515 A * 12/1995 Liu ...................... B60Q 1/1423
362/276
2007/0115357 A1* 5/2007 Stein .................... B60Q 1/0023
348/148

(Continued)

FOREIGN PATENT DOCUMENTS

DE    19533863         3/1997
DE    19533863 A1 *    3/1997 ........... B60H 1/2209

(Continued)

OTHER PUBLICATIONS

International Search Report for Application No. PCT/EP2016/060473 dated Jul. 19, 2016 (English Translation, 3 pages).

*Primary Examiner* — Jacob M Amick
*Assistant Examiner* — Charles Brauch
(74) *Attorney, Agent, or Firm* — Michael Best & Friedrich LLP

(57) ABSTRACT

The invention relates to a vehicle (1) having an internal combustion engine operated by means of a gas, wherein the gas is stored under pressure in a gas tank (5) and is fed to the internal combustion engine as needed for the operation of the internal combustion engine and a safety device having a pressure relief valve (7) is provided, which safety device becomes active when a specified discharge gas pressure is exceeded in the gas tank (5). According to the invention, a vehicle (1) and a method for operating a gas-operated vehicle having an improved safety device for gas discharged from a gas tank (5) when a discharge gas pressure is exceeded are specified. This is achieved in that the safety device comprises a burner (9) for burning off the discharged gas and that it is determined beforehand whether the vehicle is outdoors or in a hall.

12 Claims, 1 Drawing Sheet

(52) U.S. Cl.
CPC .... *F02M 21/0221* (2013.01); *F02M 21/0242* (2013.01); *B60K 2015/03026* (2013.01)

(56) References Cited

U.S. PATENT DOCUMENTS

| | | | | |
|---|---|---|---|---|
| 2010/0168989 A1* | 7/2010 | Gao | ............... | F02D 41/2422 701/110 |
| 2011/0061445 A1* | 3/2011 | Roehr | ............... | B60S 1/0866 73/29.02 |
| 2011/0294079 A1* | 12/2011 | McBride | ............... | F23C 99/003 431/126 |
| 2013/0179032 A1* | 7/2013 | Kyrtsos | ............... | B60H 1/00807 701/36 |
| 2013/0255232 A1* | 10/2013 | Maeda | ............... | F01N 11/007 60/276 |
| 2014/0277935 A1* | 9/2014 | Daman | ............... | G08G 1/127 701/36 |

FOREIGN PATENT DOCUMENTS

| | | |
|---|---|---|
| DE | 69613766 | 5/2002 |
| DE | 102008019594 | 10/2009 |
| DE | 102012024717 | 6/2014 |
| DE | 102013223259 | 5/2015 |

\* cited by examiner

VEHICLE HAVING AN INTERNAL COMBUSTION ENGINE OPERATED BY MEANS OF A GAS

BACKGROUND OF THE INVENTION

The invention relates to a vehicle having an internal combustion engine operated by means of a gas, wherein the gas is stored under pressure in a gas tank and is capable of being fed to the internal combustion engine as needed for the operation of the internal combustion engine, and a safety device having a pressure relief valve is provided, which safety device becomes active when a specified discharge gas pressure is exceeded in the gas tank.

A suchlike vehicle is known from DE 10 2006 052 109 A1. Said vehicle has an internal combustion engine operated by means of a gas, wherein the gas is stored in a gas tank. Pressure relief of the gas tank is initiated if a specified gas pressure is exceeded in the gas tank, which can occur, for example, as the result of excessive heating due to solar radiation. Said pressure relief takes place via a pressure relief valve, through which the gas is released into the environment.

The invention has as its object to propose a gas-powered vehicle and a method for operating a suchlike vehicle, which vehicle has an improved safety device for gas to be released from a gas tank when a specified discharge gas pressure is exceeded.

SUMMARY OF THE INVENTION

Said object is accomplished in that the safety device includes a burner for flaring the released gas. The inventive method for operating a suchlike vehicle provides that the safety device includes a burner, and that, when the specified discharge gas pressure is exceeded, the gas released via the pressure relief valve is flared. This embodiment or this method is based on the finding that in a previous safety device, the gas in the event of an increase in temperature brought about for example by solar radiation and the resulting evaporation of the gas with a simultaneous increase in pressure is released into the environment until the gas pressure inside the gas tank again reaches a permissible value. No consideration is given to the environment in this case, which is particularly critical if the gas is considered to be a greenhouse gas. This is the case with methane, for example. If the vehicle is also standing in a poorly ventilated room, hazards can be caused by a resulting explosive mixture. The fact that the discharged gas is flared according to the invention in a burner means that the aforementioned hazards are eliminated.

In a further development of the invention, the burner exhibits an ignition device. Said ignition device is configured in such a way that it is actuated automatically if a gas, in particular methane, is introduced into the burner. The ignition device can be configured in the form of a piezo ignition device, for example.

In a further embodiment of the invention, a control unit for operating the burner and the ignition device is provided, wherein the control unit can be activated depending on a gas pressure prevailing inside the gas tank. In this case, the activation of the control unit preferably takes place in good time before reaching the specified gas discharge pressure, in order to implement the measures set out below. Activation of the control unit takes place, for example, when a threshold of 80% of the specified gas discharge pressure is exceeded, at which the gas is discharged via the pressure relief valve.

In a further embodiment of the invention, signals from two (or more) light sensors are supplied to the control unit. These light sensors are arranged spaced apart from one another. As a result, it is possible to detect whether the vehicle is standing, for example, inside a hangar or in the open under a tree. If both light sensors are exposed at the same time to a constant light intensity, a location inside a hangar, for example, may be assumed. If there is a variation in the light intensity determined by the two light sensors, it may be assumed that the vehicle is parked in the open, for example under a tree.

In a further embodiment of the invention, a signal from a temperature sensor is supplied additionally to the control unit. As a result, a further improved evaluation in respect of the possible location of the vehicle can be achieved. If both light sensors are exposed at the same time with a constant light intensity, and if the temperature remains reasonably constant for a specified period, for example one to two days, a location inside a hangar may be assumed with a high degree of probability. If, on the other hand, a variation occurs in the light intensity determined by the light sensors, or if the light intensity changes over a constant period with a time delay, whereby a change in the temperature is determined in addition, the vehicle is standing under a tree or a bridge, for example.

In a further embodiment of the invention, the at least one light sensor and/or the temperature sensor are disposed on an exposed area of the vehicle that is unprotected from the environment, in particular on a roof of the vehicle. For example, the roof of the vehicle cab or a spoiler mounted on the roof are utilized for this purpose.

In a further embodiment of the invention, an acoustic signal generator is provided, which signal generator is controlled in the event of the operation of the burner. Said acoustic signal generator is fundamentally always capable of being operated in the event of the actuation of the burner, or also only if it is determined with high probability that the vehicle is standing inside an enclosed space. Attention is drawn by this signal to possible hazards.

In a further development, an oxygen measuring device is provided. Said oxygen measuring device measures the oxygen concentration of the environment and thus permits an additional control function of the control unit. For example, the oxygen required for flaring the gas can be taken from a compressed air reservoir, oxygen for diluting the exhaust gas is discharged into the environment from the compressed air reservoir and/or the flaring operation is stopped.

BRIEF DESCRIPTION OF THE DRAWINGS

Further advantageous embodiments of the invention can be appreciated from the description of the drawing, in which an illustrative embodiment of the invention represented in the figures is described in more detail.

In the drawing.

DETAILED DESCRIPTION

Figure 1:
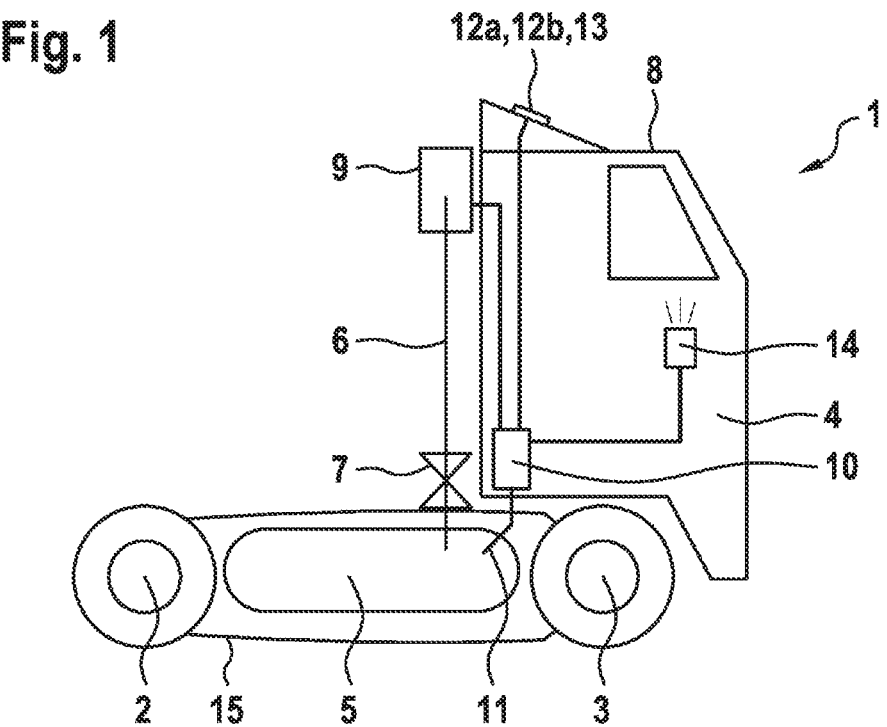
FIG. 1 depicts a schematic side view of a vehicle having a gas-powered internal combustion engine with a safety device embodied according to the invention.

FIG. 1 depicts a purely schematic side view of a vehicle, which may be a tractor unit of a commercial vehicle, for example. The vehicle 1 has a frame 15 with a rear wheel axle 2 and a front wheel axle 3, wherein a driver's cab 4 is disposed above the front wheel axle 3 and is secured to the frame 15. Installed in the vehicle 1 is an internal combustion engine (not illustrated here), which is operated by means of a gas, for example methane, stored in a gas tank 5. The gas in this case (after removal from the gas tank 5) can be supplied to the internal combustion engine in a liquid or gaseous state. This will depend on the gas and/or the control of the corresponding injection system. The internal combustion engine interacts with the rear axle 2, for example via a transmission, in order to propel the vehicle 1.

Figure 2:
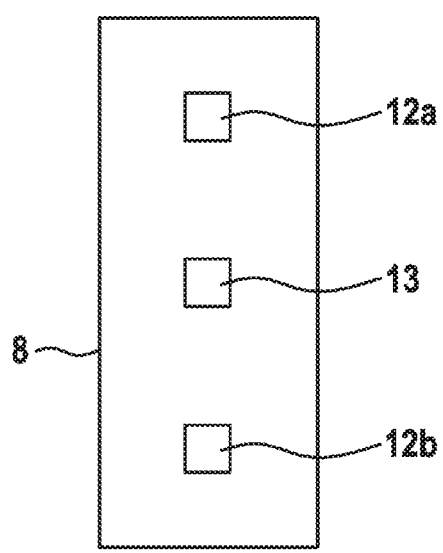
FIG. 2 depicts a schematic view of a roof of a vehicle having sensors disposed thereon.

The gas is stored in the liquid state in the gas tank 5. In the event of the vehicle 1 being left standing for a longer period under the effect of solar radiation on the gas tank 5, a positive pressure may occur inside the gas tank 5, which positive pressure arises as a consequence of the vaporization of the liquid gas. A safety device, which comprises a discharge line 6 having a pressure relief valve 7 interacting with the gas tank 5, is provided in order to prevent an unacceptably high increase in pressure inside the gas tank 5. As an alternative, the pressure relief valve 7 can also be integrated into the gas tank 5. The discharge line 6 is routed upwards as far as a roof 8 of the driver's cab 4, for example, and in this region has a burner 8 with an integrated ignition device. A control unit 10, which in particular controls the operation of the burner 9, is also disposed at an appropriate point on the vehicle, for example inside the driver's cab 4. Signals from a pressure sensor 11 and from light sensors 12a, 12b disposed in the region of the roof 8 and from a temperature sensor 13 (see also FIG. 2), are supplied to the control unit 10. The light sensors 12a, 12b are arranged spaced apart from one another either directly on the roof 8 or on a device arranged on the roof, for example a spoiler, so that said light sensors receive different light signals when the vehicle 1 is parked under a moving covering, as in the case of a tree, for example, having leaves that are caused to move by the wind.

The function of the inventive system is described below.

The pressure sensor 11 detects inside the gas tank 5 a gas pressure, which has a value of approximately 80% of a specified gas discharge pressure, for example, at which the pressure relief valve 7 admits gas into the discharge line 6. This gas pressure, which is higher compared with the normal gas pressure, arises in particular in the event of solar radiation on the gas tank 5, in conjunction with which the stored liquid gas is heated and is increasingly vaporized as a result of the solar radiation. In this first operating condition, the control unit 10 is activated by the light sensors 12a, 12b and the temperature sensor 13, which control unit evaluates the signals received from the light sensors 12a, 12b and the signal from the temperature sensor 13 over a period of time. If, for example, the signals received from the light sensors 12a, 12b are almost identical, and the signal received from the temperature sensor 13 is reasonably constant, it may be assumed that the vehicle 1 is parked in a hangar, for example, into which the solar radiation penetrates (for example through a glass roof). If, however, in particular the values received from the light sensors 12a, 12b differ from one another and/or if the signals received from the temperature sensor 13 over a specified interval of time, for example of one day or two days, exhibit clearly different values, it may be assumed that the vehicle is standing in the open, for example under a tree or a bridge. The information obtained in this way is used to control the burner and/or an acoustic signal generator 14.

The control unit 10 thus ensures, in the event of a further increase in the pressure of the gas inside the gas tank 5, and in the event of reaching the specified gas discharge pressure, at which the pressure relief valve 7 opens automatically and admits gas from the gas tank 5 into the discharge line 6, that the ignition device of the burner 9 is operated and ignites the gas flowing into the burner 9, so that said gas is flared in a controlled manner by the addition of oxygen (ambient air). No harmful impact on the environment thus results from the mixing of a gas considered to be a greenhouse gas, for example methane, with the ambient air.

At least if—as previously mentioned—it is determined that the vehicle 1 is standing in a hangar, an acoustic signal is generated additionally by the signal generator 14, which signal informs of possible hazards, which are caused in particular as a result of the removal of oxygen inside the hangar and as a result of the exhaust gases that are produced in the course of the flaring operation. In order to compensate for the removal of oxygen, the oxygen that is required for combustion can be taken from a compressed air reservoir, which is installed in the vehicle.

The invention claimed is:

1. A vehicle (1) having an internal combustion engine operated by means of a gas, wherein the gas is stored under pressure in a gas tank (5) for feeding the gas to the internal combustion engine as needed for the operation of the internal combustion engine, the vehicle comprising:
   two light sensors (12a, 12b),
   a safety device having a pressure relief valve (7) for a release of gas from the gas tank (5) and having a burner for flaring released gas, wherein the pressure relief valve opens when a specified discharge gas pressure is exceeded in the gas tank (5), and
   a control unit (10) for operating the burner, wherein the control unit (10) determines whether the vehicle (1) is located outdoors or indoors based on signals from light sensors (12a, 12b), the control unit being configured to actuate the burner when a gas pressure inside the gas tank (5) exceeds the specified discharge gas pressure.

2. The vehicle (1) as claimed in claim 1, characterized in that the burner (9) includes an ignition device.

3. The vehicle (1) as claimed in claim 1, further comprising a temperature sensor (13) for supplying a signal to the control unit (10).

4. The vehicle (1) as claimed in claim 1, characterized in that the light sensors (12a, 12b) are disposed on an exposed area of the vehicle (1) that is unprotected from an environment.

5. The vehicle (1) as claimed in claim 1, further comprising an acoustic signal generator (14) controlled by the control unit (10) in the event of the operation of the burner (9).

6. The vehicle (1) as claimed in claim 1, further comprising an oxygen measuring device connected to the control unit.

7. A method for operating a vehicle (1), having an internal combustion engine operated by means of a gas, wherein the gas is stored under pressure in a gas tank (5) for feeding the gas to the internal combustion engine as needed for the operation of the internal combustion engine, the method comprising;
   determining whether the vehicle (1) is located outdoors or indoors by evaluating signals from light sensors (12a, 12b) and from a temperature sensor (13), and
   providing a safety device having a pressure relief valve (7) and a burner, wherein the pressure relief valve opens when a specified discharge gas pressure is exceeded in the gas tank (5), and wherein, when the specified discharge gas pressure is exceeded, the gas released via the pressure relief valve (7) is flared in the burner (9).

8. The vehicle (1) as claimed in claim 4, wherein the exposed area of the vehicle (1) is a roof (8) of the vehicle (1).

9. The vehicle (1) as claimed in claim 3,
characterized in that the temperature sensor (13) is disposed on an exposed area of the vehicle (1) that is unprotected from an environment.

10. The vehicle (1) as claimed in claim 9, wherein the exposed area of the vehicle (1) is a roof (8) of the vehicle (1).

11. The vehicle (1) as claimed in claim 9, wherein the control unit determines whether the vehicle is indoors or outdoors based in part on fluctuation of a light intensity measured by the light sensors.

12. The vehicle (1) as claimed in claim 5, wherein the control unit activates the acoustic signal generator (14) when the control unit (10) determines the vehicle is indoors.

* * * * *